R. W. SELLEW.

ANTIFRICTION BEARING.

APPLICATION FILED MAY 28, 1921.

Reissued Nov. 22, 1921. 15,233.

Inventor
R. W. Sellew

By his Attorneys
Mitchell Allen.

UNITED STATES PATENT OFFICE.

ROLAND WINCHESTER SELLEW, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

ANTIFRICTION BEARING.

15,233. Specification of Reissued Letters Patent. Reissued Nov. 22, 1921.

Original No. 1,375,019, dated April 19, 1921, Serial No. 383,523, filed May 22, 1920. Application for reissue filed May 28, 1921. Serial No. 473,386.

*To all whom it may concern:*

Be it known that I, ROLAND W. SELLEW, a citizen of the United States of America, residing at New Britain, Connecticut, have invented a new and useful Antifriction Bearing, of which the following is a specification.

My invention relates to so-called "unitary" or unit handling bearings, and the same is especially useful as applied to duplex or double row ball bearings, in which it is desired to have the load on the respective balls carried in opposite oblique directions whereby the finished bearing will successfully withstand both radial and thrust loads. Heretofore, many means have been devised to facilitate the assembly of such bearings and ordinarily one of the bearing rings has been made of two separate pieces mechanically connected. These methods have not proved entirely satisfactory. By my improvement, each of the two bearing rings, the inner one and the outer one, is, in its finished state, solid or integral. This result I accomplish by the use of a fused connection, preferably attained by the welding process. I likewise avoid undue cramping or binding of the bearing rings on the balls.

Figure 1:
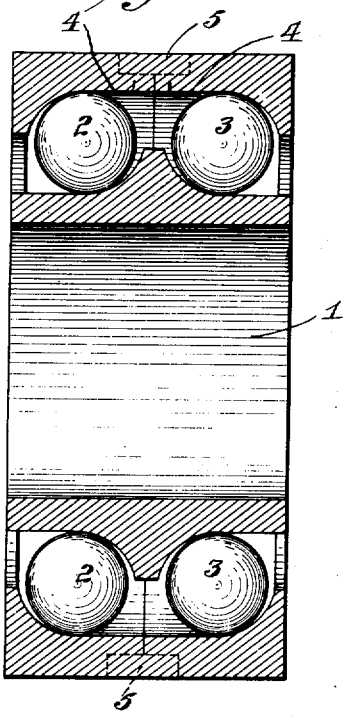
Figure 1 is a sectional view of a bearing of the two row type constructed to embody my invention and made by one process.
Figure 4:
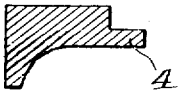

In the bearing produced by the method illustrated in Fig. 1, 1 represents the inner bearing ring or element, upon the outer surface of which are two spaced ball tracks separated by a circumferential rib. 4 represents the outer bearing ring or element having on its surface two spaced ball tracks complementary to the aforesaid race-ways on the inner ring. Between these race-ways are located two rows of balls 2—3. In the present instance, I have shown no spacer devices for the balls, but as such devices are well understood, they may be provided if desired. The outer bearing element is made of two separately formed rings of a cross section, for example, such as shown in Fig. 4. The edges of each of these rings are preferably caused to abut when the bearing is assembled, the same being so designed and proportioned as to properly fit upon the balls with the desired degree of contact pressure when said edges are connected. 5 is a ring-like piece which bridges the adjacent edges of the two rings constituting the outer bearing element, and this piece 5, in the particular form shown, constitutes in effect a fillet. Preferably, the bridging piece is made of a metal corresponding to the two ring sections, although it may be made of any metal that can be fusibly connected therewith so as to secure a strong connection and satisfactory union. The method of assembly is obvious. It will be seen that the balls are placed in a proper position on the bearing element 1 and then the two parts of the outer bearing element and the surrounding ring-like element 5 are placed together and held in any suitable form of holder while the fused connection is being made, which fused connection is preferably effected by means of an electric welding process which is one of the well known processes available for that purpose. In Fig. 1, I have shown by dotted lines the section of the bridging ring section 5, inasmuch as there would of course be no definite line of demarcation or separation if the parts have been fully fused together.

Figure 2:
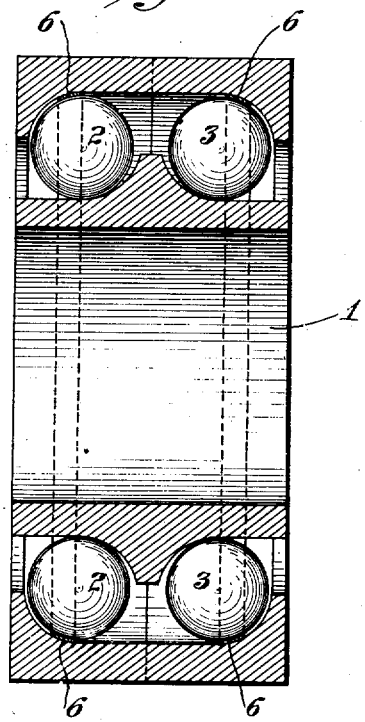
Fig. 2 is a similar view illustrating a modification.
Figure 3:
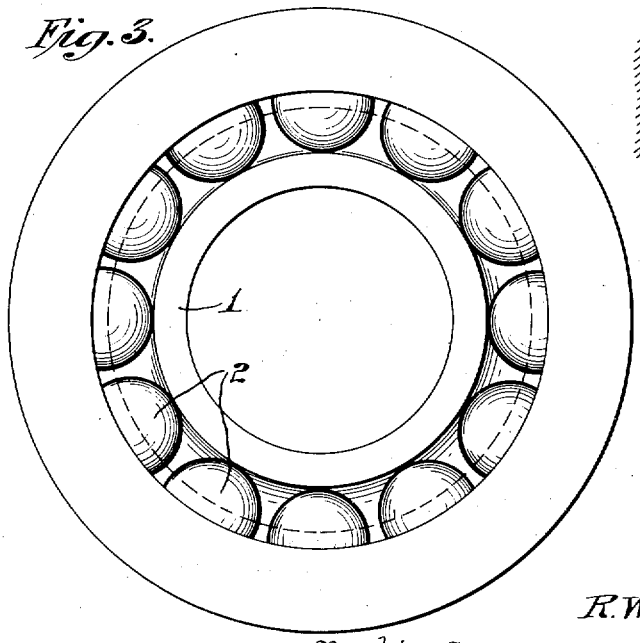
Fig. 3 is a side elevation of the complete bearing shown in either of the aforesaid figures.
Figure 5:
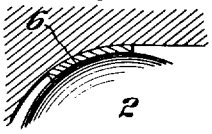
Figs. 4 and 5 are fragmentary or detail views in section.

In Fig. 2 I have produced the bearing by a different process wherein the two ring portions of the outer bearing element 4 are caused to actually abut and are fused together. In this case the surrounding ring 5 is omitted. When the parts are butt welded by an electric welding process, it is necessary to press the same together firmly and to guard against pressing the two ring sections too tightly upon the balls, and so as to prevent undue binding, I preferably introduce one or more thin destructible shims 6—6 between the ball race-ways or tracks and the balls adjacent thereto. In Fig. 5, I have illustrated one of these shims 6 on an exaggerated scale. Obviously, when the two ring sections of the outer bearing element are forced hard together, the adjacent destructible shim will act as an adequate spacer, so that as the adjacent edges of said rings are being fused together, said ring sections will not be forced together so tightly as to improperly bind on the balls. After the fusing operation has been completed, the destructible shim or shims may be cut out or otherwise removed to afford the desired freedom between the bearing elements and the balls, whereby the same may turn evenly and easily. Any suitable material may be employed for the shims, only care should be observed to select a material of uniform thickness throughout so that the finished bearing will be no tighter on one side than on the other. It will be observed that the balls 2 so engage the rings, and vice versa, that the rings and balls alike are not only held in an assembled state, but also in a proper adjusted relation, the latter being a feature typical of the so-called "unitary" ball bearing. While the particular process of manufacture constitutes no part of this invention as claimed herein, I nevertheless deem it desirable to describe the processes of manufacture as well as the bearing itself so that anyone skilled in the art may understand how such a bearing can be successfully produced. Any roughness or unevenness where the fused connection occurs, may be ground away, and if desired, a proper provision may be made in the two ring sections whereby a portion of the surface may be ground off after fusion is completed.

While in many instances it is preferable to employ a welding process for the purpose of effecting the fused connection aforesaid, it should be understood that my invention is not limited to that particular process, and while I have shown the outer bearing element as the one made up of two rings united by fused conection, my invention is not necessarily limited thereto, nor is said invention limited to a duplex or double row bearing.

What I claim is:

1. A ball bearing of the type described, comprising an inner and an outer bearing ring having complementary race tracks therein with balls in said race tracks operating to hold said rings in adjusted and operative position, one of said bearing rings being formed of two annular ring sections each section having a ball bearing surface forming one of said tracks, and a welded connection between said sections to permanently unite the same.

2. A double row ball bearing of the type described, comprising an inner and an outer bearing ring having two sets of complementary ball race tracks therein, two rows of balls in said race tracks operating to hold said rings in adjusted and operative position, one of said rings being formed of two ring sections each section having one of said race tracks thereon, and a welded connection between said sections to permanently unite the same.

3. A double row ball bearing of the type described, comprising an inner and an outer bearing ring having two sets of complementary race tracks therein, two rows of balls in said race tracks operating to hold said rings in adjusted and operative position, one of said rings being formed of two ring-like sections each section having one of said tracks thereon, and a welded connection between said sections to permanently unite the same, the complementary race tracks being oblique to each other.

4. A ball bearing of the type described, comprising an inner and an outer bearing ring with complementary ball race tracks therein, balls in said race tracks operating to hold said bearing rings in assembled and operative position, one of said rings comprising two abutting annular ring sections and a third ring section adjacent the abutting portions of the first two sections, and a welded connection between all of said sections to permanently unite the same.

5. A ball bearing of the type described, comprising an inner and an outer bearing ring having complementary race tracks therein with balls in said race tracks operating to hold said rings in assembled and operative position, one of said bearing rings being formed of two annular ring sections, each of said sections having a ball bearing surface thereon forming one of said race tracks, and a welded connection at the adjacent edges of said two ring sections operating to permanently unite said sections.

6. A ball bearing of the type described, comprising an inner and an outer bearing ring having complementary race tracks therein, balls in said race tracks operating to hold said bearing rings in adjusted and operative position, the outer bearing ring being formed of two annular ring sections each section having a ball bearing surface thereon forming one of said race tracks, and a welded connection operating to permanently unite said two sections.

7. A bearing of the type described comprising, an inner and an outer bearing ring having complementary race tracks therein with balls in said tracks operating to hold said rings in adjusted and operative position, one of said bearing rings being formed of two annular ring sections each having a ball bearing surface forming one of said tracks and including a ring-like portion bridging the space between said tracks and overlapping the cylindrical surface of one of said sections, and a fused connection between said overlapping surfaces to prevent separation of said sections.

8. A bearing of the type described comprising, an inner and an outer annular bearing element having complementary ball races therein, with balls in said races operating to hold said elements in operative position, one of said elements being formed of two annular ring sections, each section having a ball bearing surface which surfaces coöperate to form the ball race of said element, and means bridging the adjacent edges of said ring sections and overlapping at least one section, and a fused connection between said overlapping surfaces for holding the same against lateral separation.

ROLAND WINCHESTER SELLEW.